United States Patent [19]

Sturm et al.

[11] 3,714,240
[45] Jan. 30, 1973

[54] PRODUCTION OF O-BENZOYLBENZOIC ACID

[75] Inventors: Hans Juergen Sturm; Herbert Armbrust, both of Gruenstadt, Germany

[73] Assignee: Badische Anilin- & Soda-Fabrik Aktiengesellschaft, Ludwigshafen/Rine, Germany

[22] Filed: Jan. 18, 1971

[21] Appl. No.: 107,593

[30] Foreign Application Priority Data

Jan. 28, 1970 Germany.....................P 20 03 599.8
June 12, 1970 Germany.....................P 20 29 027.1
June 13, 1970 Germany.....................P 20 29 248.2

[52] U.S. Cl..............................................260/517

[51] Int. Cl..............................................C07c 65/20
[58] Field of Search..........................260/523 R, 517

Primary Examiner—Lorraine A. Weinberger
Assistant Examiner—R. S. Weissberg
Attorney—Johnston, Root, O'Keeffe, Keil, Thompson & Shurtleff

[57] ABSTRACT

The production of o-benzoylbenzoic acid by oxidation of indanes with nitrogen dioxide in the presence of selenium dioxide.

The compound which can be prepared by the process according to the invention is a valuable starting material for numerous syntheses. It is of special significance as a starting material for the production of anthraquinone.

9 Claims, No Drawings

PRODUCTION OF O-BENZOYLBENZOIC ACID

The invention relates to a process for the production of o-benzoylbenzoic acid by oxidation of indanes with nitrogen dioxide in the presence of selenium dioxide.

It is known from Ullmanns Excyklopadie der Technischen Chemie, volume 3, page 660, that phthalic anhydride and benzene can be reacted in the presence of aluminum chloride in a Friedel-Crafts reaction to form o-benzoylbenzoic acid. A disadvantage of this method is the uneconomically high consumption of catalyst.

o-Benzoylbenzoic acid is also formed in the oxidation of 1-methyl-3-phenylindane with chromic acid, but only in an unsatisfactory yield and together with a large amount of byproducts, for example o-acetylbenzophenone (Journal of Organic Chemistry, volume 19 (1954), pages 17 et Seq.; Journal of the American Chemical Society, volume 72 (1950), pages 4918 et seq.). This result is at least partly attributable to the influence of the oxidizing medium on the o-benzoylbenzoic acid formed. When o-benzoylbenzoic acid is oxidized under the conditions of this method, only 45 percent of the starting material is recovered unconverted, the major portion thus having been destroyed by the oxidizing medium (J. Am. Chem. Soc., loc. cit., page 4920). When 1,1,3-trimethyl-3-phenylindane is used as the starting material, the oxidation method has to be modified but even the modified method gives only moderate yields of o-benzoylbenzoic acid and a large amount of o-acetylbenzophenone (Berichte der Deutschen Chemischen Gesellschaft, volume 90 (1957), pages 1208 et seq.).

It is known from Advances in Chemistry, Series 51, (Am. Chem. Soc., Washington 1965), pages 89 to 98, that 2,6-dimethylnaphthalene can be oxidized with nitrogen dioxide in the presence of selenium dioxide to form the corresponding dicarboxylic acid. In a similar way, anthracene can be reacted to form anthraquinone and methylsubstituted benzenes to form the corresponding benzoic acid derivatives.

It is an object of this invention to provide a new process for the production of o-benzoylbenzoic acid in good yields and purity by a simpler and more economical method.

We have now found that the production of o-benzoylbenzoic acid by oxidation of indanes is advantageously carried out by oxidizing an indane having the general formula:

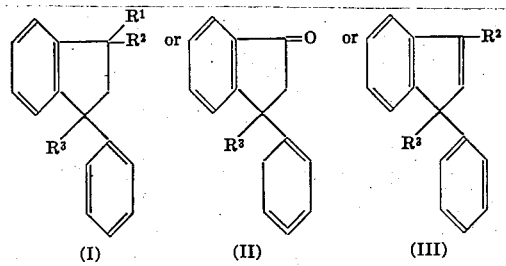

in which $R^1$, $R^2$ and $R^3$ may be identical or different and each denotes an alkyl radical and $R^1$ and/or $R^3$ may also denote a hydrogen atom, with nitrogen dioxide in the presence of selenium dioxide.

When 1-methyl-3-phenylindane is used, the reaction may be represented by the following formulas

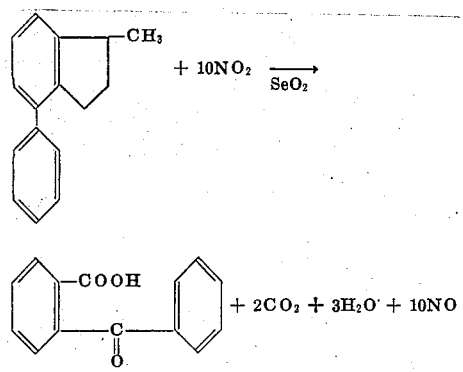

In contrast to prior art methods, the process according to the invention gives o-benzoylbenzoic acid by a simpler and more economical method in good yields and purity and without the formation of appreciable amounts of o-acetylbenzophenone. These advantageous results are surprising since owing to the use of nitrogen dioxide it would have been expected that an additional considerable amount of nitrated compounds would be formed or that only the methyl group would be oxidized. Nitrogen monoxide formed from the nitrogen dioxide in the oxidation of the indane may be oxidized to the dioxide again practically quantitatively, for example with air, according to the methods indicated in Advances in Chemistry, loc. cit., pages 95 to 96.

The indanes used as starting materials (I), (II) and (III) are indanones, dehydroindances and indanes which are not dehydrogenated and do not contain any oxo groups.

The indanes (I) may be prepared by dimerization of unsubstituted or substituted styrenes, for example by the methods described in the above-mentioned publications or in Rabjohn, Organic Syntheses, Collective Volume IV (John Wiley Inc., New York 1963), pages 665 et seq.

Starting materials (II) may be prepared for example from appropriate β,β-diphenylpropionyl chlorides by cyclization (J. Org. Chem. 19 (1954), 22).

The starting materials (III) may be prepared for example from appropriate 1-hydroxyindanes by elimination of water (J. Org. Chem. 19 (1954), 22).

Preferred indanes (I), (II) and (III) are those in whose formulas $R^1$, $R^2$ and $R^3$ may be identical or different and each denotes an alkyl radical having one to eight, particularly one to four, carbon atoms, and $R^1$ and/or $R^3$ may also denote a hydrogen atom.

Examples of suitable indanes (I) are:
1-methylindane, 1,3-dimethylindane, 1,1,3-trimethylindane, 1-propylindane and 1-isobutyl-3-phenylindane.

Examples of suitable indanones (II) are:
3-methylindanone-(1), 3-propylindanone-(1), 3-isobutyl-3-phenylindanone-(1) and preferably 3-phenylindanone-(1). Examples of suitable indanes (III) are:
1,3-dimethylindane, 1-propylindane, 1-isobutyl-3-phenylindane and preferably 3-phenyl-1-methylindane.

The reaction is carried out as a rule at a temperature of from 50° to 250° C, preferably from 150° to 220° C. Atmospheric pressure or superatmospheric pressure may be used, for example a pressure of up to 100 atmospheres, generally at the autogenous pressure under the reaction conditions. The reaction may be carried out continuously or batchwise. Organic solvents which are inert under the reaction conditions, such as chlorohydrocarbons, for example chlorobenzene, dichlorobenzene and preferably trichlorobenzene, or appropriate mixtures, are usually employed.

The starting material (I), (II) or (III) is reacted with nitrogen dioxide or its dimer, nitrogen tetroxide, in a stoichiometric amount or in excess, preferably in a molar ratio of 1 mole of starting material to 10 to 40, particularly 10 to 30, moles of nitrogen dioxide. The dioxide may be present in solid or liquid form or advantageously in the form of gas. It may be prepared for example by heating nitrosylsulfuric acid or lead nitrate but as a rule it is manufactured by catalytic combustion of ammonia.

Oxidation is carried out in the presence of selenium dioxide, generally in an amount of from 0.1 to 15 percent by weight, preferably from 1 to 10 percent by weight, of selenium dioxide based on the starting material.

The reaction may be carried out as follows:
Nitrogen dioxide is passed at the reaction temperature through a mixture of starting material, selenium dioxide and if desired a solvent. The end of the reaction is indicated by the fact that no more nitrogen dioxide is consumed. The water of reaction formed is removed during the reaction, advantageously azeotropically. The reaction mixture is then swept with nitrogen to remove oxides of nitrogen and extracted with aqueous caustic alkali solution, for example of 1 to 50 percent by weight strength. The end product may then be isolated by a conventional method, for example by separation of the aqueous phase formed, acidification of this phase and filtration of the o-benzoylbenzoic acid thus precipitated.

The compound which can be prepared by the process according to the invention is a valuable starting material for numerous syntheses (see for example Ullmanns Encyklopadie der Technischen Chemie, volume 3, pages 660 et seq.). It is of special significance as a starting material for the manufacture of anthraquinone. The process according to the invention constitutes an elegant method of making anthraquinone starting from inexpensive styrene. It is advantageous to cyclize the o-benzoylbenzoic acid to anthraquinone immediately after its isolation; the yield of o-benzoylbenzoic acid may therefore be calculated accurately from the yield of anthraquinone. Benzanthrone (another starting material for dyes) is obtained by reaction with glycerol under reducing conditions (Annali di Chimica Applicata, volume 22 (1932), pages 691 et seq.).

The invention is illustrated by the following Examples, in which parts are by weight.

EXAMPLE 1

10 parts of 1-methyl-3-phenylindane, 1 part of selenium dioxide and 100 parts of trichlorobenzene are placed in a reaction tube having fritted glass disk as its base, the mixture is heated to 180° to 190° C and 60 parts of nitrogen dioxide is passed at this temperature through the fritted disk in the course of 2.5 hours. The water formed is removed azeotropically during the reaction. After being swept with nitrogen, the trichlorobenzene solution is treated with 10 percent by weight, aqueous caustic soda solution, the aqueous phase is separated and 9 parts of crude o-benzoylbenzoic acid is precipitated therefrom with 36.5 percent by weight hydrochloric acid. After cyclization, 5.0 parts of anthraquinone having a melting point of 287° to 288° C is obtained, which is equivalent to a yield of 50 percent of the theory.

EXAMPLE 2

As described in Example 1, 10 parts of 1-methyl-3-phenylindane, 70 parts of trichlorobenzene and 1 part of selenium dioxide are heated to 200° to 210° C and 38 parts of nitrogen dioxide is passed through the frit at the said temperature in the course of one hour. Processing in accordance with Example 1 gives 5.5 parts of anthraquinone (55 percent of the theory) having a melting point of 288° to 289° C is obtained.

EXAMPLE 3 (COMPARATIVE EXAMPLE)

As described in Example 1, but in the absence of selenium dioxide, 45 parts of nitrogen dioxide is passed in the course of one hour at 190° to 200° C into 10 parts of 1-methyl-3-phenylindane and 70 parts of trichlorobenzene. After working up according to Example 1, 3.3 parts of anthraquinone (33 percent of the theory) is obtained having a melting point of 286° to 287° C.

EXAMPLE 4

10 parts of 3-phenylindanone-(1), 50 parts of trichlorobenzene and 1 part of selenium dioxide are placed in a reaction tube whose base consists of a fritted glass disk, the mixture is heated to 160° to 170° C and 48 parts of nitrogen dioxide is passed in through the fritted disk in the course of ninety minutes. The water formed is removed azeotropically during the reaction. After the trichlorobenzene solution has been swept with nitrogen, it is treated with 10 percent by weight aqueous caustic soda solution, the aqueous phase is separated and 8.9 parts of o-benzoylbenzoic acid is precipitated therefrom with 36.5% hydrochloric acid. 6.0 parts of anthraquinone (60 percent of the theory) having a melting point of 286° to 287° C is obtained.

EXAMPLE 5

10 parts of 3-phenyl-1-methylindene, 1 part of selenium dioxide and 50 parts of trichlorobenzene are placed in a reaction tube whose base consists of a fritted glass disk, the mixture is heated to 160° C and 52 parts of nitrogen dioxide is passed through the fritted disk in the course of ninety minutes. The water formed is removed azeotropically during the reaction. After the trichlorobenzene solution has been swept with nitrogen, it is treated with 10 percent b weight aqueous caustic soda solution, the aqueous phase is separated and o-benzoylbenzoic acid is precipitated therefrom with 36.5 percent hydrochloric acid.

There is obtained 8.8 parts of o-benzoylbenzoic acid and after cyclization 5.4 parts of anthraquinone (54.5 percent of the theory) having a melting point of 284° C to 286° C.

We claim:

1. A process for the production of o-benzoylbenzoic acid by oxidation of an indane wherein an indane having the general formula:

(I)  (II)  (III)

in which $R^1$, $R^2$ and $R^3$ may be identical or different and each denotes an alkyl radical and $R^1$ and/or $R^3$ may also denote a hydrogen atom, is reacted with nitrogen dioxide in the presence of selenium dioxide.

2. A process as claimed in claim 1 wherein an indane having the general formula:

(I)

in which $R^1$, $R^2$ and $R^3$ may be identical or different and each denotes an alkyl radical and $R^1$ and/or $R^3$ may also each denote a hydrogen atom, is reacted with nitrogen dioxide in the presence of selenium dioxide.

3. A process as claimed in claim 1 wherein the starting material is an indanone-(1) having the general formula:

(II)

in which $R^3$ has the meaning given in claim 1.

4. A process as claimed in claim 1 wherein the starting material is an indene having the general formula:

(III)

in which $R^2$ and $R^3$ have the meanings given in claim 1.

5. A process as claimed in claim 1 carried out at a temperature of from 50° to 250° C.

6. A process as claimed in claim 1 carried out at a temperature of from 150° to 220° C.

7. A process as claimed in claim 1 carried out in the presence of an organic solvent which is inert under the reaction conditions.

8. A process as claimed in claim 1 carried out in a molar ratio of 1 mole of starting material to 10 to 30 moles of nitrogen dioxide.

9. A process as claimed in claim 1 carried out with an amount of 1 to 10 percent by weight of selenium dioxide with reference to the weight of starting material.

* * * * *